United States Patent
Ramos et al.

(10) Patent No.: US 6,965,567 B2
(45) Date of Patent: Nov. 15, 2005

(54) METHOD AND APPARATUS FOR SELECTING A LINK SET

(75) Inventors: Ituriel Mar Ramos, Saltillo (MX); Marco Antonio Garza Ortiz, Saltillo (MX)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 977 days.

(21) Appl. No.: 09/829,054

(22) Filed: Apr. 9, 2001

(65) Prior Publication Data

US 2002/0186702 A1 Dec. 12, 2002

(51) Int. Cl.[7] .............................................. H04L 12/26
(52) U.S. Cl. ...................................................... 370/235
(58) Field of Search ................................ 370/235, 236, 370/238, 394, 410, 522; 379/219, 220.01, 229, 230

(56) References Cited

U.S. PATENT DOCUMENTS

| | | | | |
|---|---|---|---|---|
| 5,029,165 A | * | 7/1991 | Choi et al. | 370/410 |
| 5,650,998 A | * | 7/1997 | Angenot et al. | 370/225 |
| 5,848,069 A | * | 12/1998 | Milne et al. | 370/426 |
| 6,002,693 A | | 12/1999 | Hahn | 370/466 |
| 6,377,675 B1 | * | 4/2002 | Rabourn et al. | 379/230 |
| 6,778,500 B1 | * | 8/2004 | Vileid et al. | 370/232 |

FOREIGN PATENT DOCUMENTS

EP 1032223 A2 2/2000

OTHER PUBLICATIONS

International Telecommunication Union ITU–T Q.700 (Mar. 1993)—Introduction to CCITT Signall System No. 7.
International Telecommunication Union ITU–T Q.704 (Jul. 1996)—Signalling Network Functions and Messages.

* cited by examiner

Primary Examiner—Kwang Bin Yao

(57) ABSTRACT

A method of selecting a link set for routing a message in a telecommunications network, that does not require in sequence delivery, according to a destination point code, a signaling link selection code and a link selector value. The link selector value is incremented from a minimum, initial value, to a maximum value so as to point to sequential links in a link set, and then reset to the minimum value. A memory node includes a load sharing a list of load sharing links set in the network, a signaling link memory for storing signaling link selection codes, and a link selector memory for maintaining a link selector value.

13 Claims, 4 Drawing Sheets

METHOD AND APPARATUS FOR SELECTING A LINK SET

BACKGROUND OF THE INVENTION

1. Technical Field

This invention relates generally to systems and methods for load sharing message traffic within a network. More particularly, the invention relates to a method for managing message traffic using load sharing between signaling links in a common channel signaling network.

2. History of Related Art

The SS7 (also called Signaling System No. 7) signaling protocol provides a practical method for implementing sophisticated, network-based intelligence services by providing "out-of-band" signaling using a separate high-speed data link for controlling telephone call setup and routing. As the demand for network-based intelligence services, such as calling number delivery and automatic callback has increased, a need to add traffic capacity and improve load balancing capabilities of the SS7 network has been recognized.

In response to this need, the standards bodies responsible for setting SS7 network standards have issued requirements to be met by SS7 network providers. The International Telecommunications Union (ITU) has also made recommendations, such as the Telecommunication Standardization Sector of ITU (ITU-T) Q.704 (herein incorporated by reference in its entirety), which addresses signaling network functions and messages, including message routing and load sharing within a link set. This recommendation addresses the distribution of message loading between signaling links, whether they belong to the same link set or not. The message routing function is based on information contained in the routing label, namely, on the Destination Point Code (DPC) and on the signaling link selection field. In some circumstances, the service indicator may also be required.

Each signaling point has routing information that allows it to determine the signaling link over which a message should be sent. Typically, the DPC is associated with more than one signaling link that may be used to carry the message. Thus, the Signaling Link Selection (SLS) code is a part of the Signaling Information Field (SIF). The SLS code is used by the Message Transfer Part (MTP) to determine the link set and the signaling link that will be used to carry traffic for every one of the SLS values.

The first step is to determine, using the MTP of the SS7, which load shared link sets will be used to carry which SLS codes. In the case of two load sharing link sets, the decision is based on the Load Sharing Bit (LSHB) method. That is, one of the four bits in the SLS code is selected, and the value of the bit is used to divide the messages into two sets; the first, for example, takes messages having the SLS code bit equal to zero and sends them to the first link set, and the second, having messages including an SLS code with the selected bit set to one, are sent to the second link set. The prior art table 1 shows how the LSHB can be used to determine which link set (i.e., 1 or 2) is used to carry the messages.

TABLE 1

| | | LSHB | | |
|---|---|---|---|---|
| LS | 0 | 1 | 2 | 3 |
| 1 | 0000 (0) | 0000 (0) | 0000 (0) | 0000 (0) |
| | 0010 (2) | 0001 (1) | 0001 (1) | 0001 (1) |
| | 0100 (4) | 0100 (4) | 0010 (2) | 0010 (2) |
| | 0110 (6) | 0101 (5) | 0011 (3) | 0011 (3) |
| | 1000 (8) | 1000 (8) | 1000 (8) | 0100 (4) |
| | 1010 (10) | 1001 (9) | 1001 (9) | 0101 (5) |
| | 1100 (12) | 1100 (12) | 1010 (10) | 0110 (6) |
| | 1110 (14) | 1101 (13) | 1011 (11) | 0111 (7) |
| 2 | 0001 (1) | 0010 (2) | 0100 (4) | 1000 (8) |
| | 0011 (3) | 0011 (3) | 0101 (5) | 1001 (9) |
| | 0101 (5) | 0110 (6) | 0110 (6) | 1010 (10) |
| | 0111 (7) | 0111 (7) | 0111 (7) | 1011 (11) |
| | 1001 (9) | 1010 (10) | 1100 (12) | 1100 (12) |
| | 1011 (11) | 1011 (11) | 1101 (13) | 1101 (13) |
| | 1101 (13) | 1110 (14) | 1110 (14) | 1110 (14) |
| | 1111 (15) | 1111 (15) | 1111 (15) | 1111 (15) |

Once the link set is selected, the SLS is used to determine the Signaling Link Code (SLC) within the link set. The distribution of the messages within the link set is dependent on the number of SLCs that the link set contains.

Within a single link set, distribution of the different SLS codes is accomplished by assigning the first SLS code (i.e., 0) to the first SLC (i.e., 0). The next SLS code is assigned to the next SLC (i.e., SLS=1 is assigned to SLC=1, SLS=2 is assigned to SLC=2, etc.). Once the last SLC defined has been assigned to an SLS, then a return is made to the first SLC and SLS codes are continuously assigned. See Table 2, below, as an example of assignments for SLS codes 0 through 15, as assigned to SLCs 0, 1, 2, and 3. It should be noted that the MTP user (e.g., the ISDN User Part "ISUP", the Telephone User's Part "TUP", and/or the Data User Part "DUP"), the Signaling Connection Control Part "SCCP", and Transaction Capabilities Application part "TCAP" assign SLS codes to messages so as to ensure that all sixteen of the SLS codes are used as evenly as possible.

TABLE 2

| | SLC = | | |
|---|---|---|---|
| 0 | 1 | 2 | 3 |
| 0 | 1 | 2 | 3 |
| 4 | 5 | 6 | 7 |
| 8 | 9 | 10 | 11 |
| 12 | 13 | 14 | 15 |

Unfortunately, following the recommendations of the ITU-T Q.704 does not lead to even distribution of network traffic. While some signaling links are congested, others are not fully loaded. For example, in the case of two load shared link sets, the recommended maximum number of signaling links is eight, because using more than eight signaling links will result in unused signaling link codes. Further, even when the difference between any two signaling links belonging to the same link set is only one SLS code, it should be noted that previous load sharing between link sets may mean that the link set will not contain all 16 of the SLS codes. For example, using column LSHB=0 of Table 1, SLS=0, 2, 4, 6, 8, 10, 12, and 14 are assigned to LS1. Thus, when these SLS codes are distributed into the link set using Table 2 (having four signaling links per link set), SLC=0, 2 each have four link sets, and SLC=1, 3 have no link sets. This problem can be seen in Table 3 below.

TABLE 3

| # of SLs for LS1 | LSHB | | | |
|---|---|---|---|---|
| | 0 | 1 | 2 | 3 |
| 2 | SL1-0,2,4,6,8,10,12,14--100%<br>SL2-0% | SL1-0,4,8,12-50%<br>SL2-1,5,9,13-50% | SL1-0,2,8,10-50%<br>SL2-1,3,9,11-50% | SL1-0,2,4,6-50%<br>SL2-1,3,5,7-50% |
| 3 | SL1-0,6,12-37.5%<br>SL2-4,10-25%<br>SL3-2,8,14-37.5% | SL1-0,9,12-37.5%<br>SL2-1,4,13-37.5%<br>SL3-5,8-25% | SL1-0,3,9-37.5%<br>SL2-1,10-25%<br>SL3-2,8,11-37.5% | SL1-0,3,6-37.5%<br>SL2-1,4,7-37.5%<br>SL3-2,5-25% |
| 4 | SL1-0,4,8,12-50%<br>SL2-0%<br>SL3-2,6,10,14-50%<br>SL4-0% | SL1-0,4,8,12-50%<br>SL2-1,5,9,13-50%<br>SL3-0%<br>SL4-0% | SL1-0,8-25%<br>SL2-1,9-25%<br>SL3-2,10-25%<br>SL4-3,11-25% | SL1-0,4-25%<br>SL2-1,5-25%<br>SL3-2,6-25%<br>SL4-3,7-25% |
| 5 | SL1-0,10-25%<br>SL2-6-12.5%<br>SL3-2,12-25%<br>SL4-8-12.5%<br>SL5-4,14-25% | SL1-0,5-25%<br>SL2-1-12.5%<br>SL3-12-12.5%<br>SL4-8,13-25%<br>SL5-4,9-25% | SL1-0,10-25%<br>SL2-1,11-25%<br>SL3-2-12.5%<br>SL4-3,8-25%<br>SL5-9-12.5% | SL1-0,5-25%<br>SL2-1,6-25%<br>SL3-2,7-25%<br>SL4-3-12.5%<br>SL5-4-12.5% |
| 6 | SL1-0,6,12-37.5%<br>SL2-0%<br>SL3-2,8,14-37.5%<br>SL4-0%<br>SL5-4,10-25%<br>SL6-0% | SL1-0,12-25%<br>SL2-1,13-25%<br>SL3-8-12.5%<br>SL4-9-12.5%<br>SL5-4-12.5%<br>SL6-5-12.5% | SL1-0-12.5%<br>SL2-1-12.5%<br>SL3-2,8-25%<br>SL4-3,9-25%<br>SL5-10-12.5%<br>SL6-11-12.5% | SL1-0,6-25%<br>SL2-1,7-25%<br>SL3-2-12.5%<br>SL4-3-12.5%<br>SL5-4-12.5%<br>SL6-5-12.5% |
| 7 | SL1-0,14-25%<br>SL2-8-12.5%<br>SL3-2-12.5%<br>SL4-10-12.5%<br>SL5-4-12.5%<br>SL6-12-12.5%<br>SL7-6-12.5% | SL1-0-12.5%<br>SL2-1,8-25%<br>SL3-9-12.5%<br>SL4-0%<br>SL5-4-12.5%<br>SL6-5,12-25%<br>SL7-13-12.5% | SL1-0-12.5%<br>SL2-1,8-25%<br>SL3-2,9-25%<br>SL4-3,10-25%<br>SL5-11-12.5%<br>SL6-0%<br>SL7-0% | SL1-0,7-25%<br>SL2-1-12.5%<br>SL3-2-12.5%<br>SL4-3-12.5%<br>SL5-4-12.5%<br>SL6-5-12.5%<br>SL7-6-12,5% |
| 8 | SL1-0,8-25%<br>SL2-0%<br>SL3-2,10-25%<br>SL4-0%<br>SL5-4,12-25%<br>SL6-0%<br>SL7-6,14-25%<br>SL8-0% | SL1-0,8-25%<br>SL2-1,9-25%<br>SL3-0%<br>SL4-0%<br>SL5-4,12-25%<br>SL6-5,13-25%<br>SL7-0%<br>SL8-0% | SL1-0,8-25%<br>SL2-1,9-25%<br>SL3-2,10-25%<br>SL4-3,11-25%<br>SL5-0%<br>SL6-0%<br>SL7-0%<br>SL8-0% | SL1-0-12.5%<br>SL2-1-12.5%<br>SL3-2-12.5%<br>SL4-3-12.5%<br>SL5-4-12.5%<br>SL6-5-12.5%<br>SL7-6-12.5%<br>SL8-7-12.5% |

Table 3 details the signaling link assignment within a single link set (i.e., LS1). The assignment of SLS codes to each signaling link leads to uneven distribution of the traffic that each signaling link handles. The percentage values indicate the percentage of traffic handled by each signaling link within the link set. The distribution percentage figures are obtained by first determining the SLS codes for the first link set using Table 1, and then assigning those codes according to the distribution of SLS codes for signaling links belonging to the link set according to Table 2. As can be seen from Table 3, out of the 64 possible cases, only seven result in even distribution of network traffic. Four of these seven cases include the scenario where all SLS codes are assigned to a single signaling link code.

The result of the current system may provide equal distribution of messages between link sets; however, the message distribution within a link set (i.e., between signaling links) may be unequal. An example of this can be seen in FIGS. 1 and 2, where the LSHB method is used to distribute messages between various link sets from the message origin to its destination. Thus, it is readily apparent that even when the load is balanced between link sets, the distribution of messages within a link set (between signaling links) depends on the number of signaling links within each link set, and the connections available between link sets. Thus, the root of the problem is that it is difficult to distribute message traffic evenly when less than all of the SLS codes are passed on to the link sets.

Another difficulty with network traffic arises from the decreasing need for inseqence message delivery service, described by ITU-T document Q.700 Introduction to CCIT Signaling System No. 7 (incorporated herein by reference in its entirety). In-sequence delivery is normally used when the application sends more data than one message can handle, and either the application or the SCCP segments the data into two or more messages. However, as mobile applications are among the fastest growing users of the SS7 network, there is no need for in-sequence delivery of messages under the ANSI-41 standard. Further, for global system mobile communications (GSM), only a few of the messages require in-sequence delivery. Finally, with the introduction in the near future of long messages (up to 4 k octets) in the SS7 networks, the need for in-sequence message delivery will decrease further.

Thus, what is needed is a method and apparatus for using out-of-sequence message delivery service by the MTP. Such a method and apparatus should improve message load distribution within link sets, and remove the prior art limitation of the number of load shared link sets and signaling links for a given destination. The method and apparatus should be available for an MTP user, or, alternatively, on a per-message basis. The method and apparatus should be usable at an originating node, and also with an indication to be sent along with messages as a way of improving traffic distribution at various Signaling Transfer Points (STPs) along the way.

SUMMARY OF THE INVENTION

The invention operates using MTP out-of-sequence message delivery service, including an indication from the MTP user at the originating node as to whether a message requires in-sequence delivery. The indication can also be sent with each message (from a non-originating node) to the next node, if the node supports out-of-sequence service. This solution to the problems described above will provide a more equitable distribution of traffic when the majority of messages do not require in-sequence delivery. The number of load shared link sets can be increased, and the limit of 16 signaling links per destination will no longer exist. This has the additional advantage of increasing bandwidth for message traffic toward destinations which are used most often.

Thus, when in-sequence message delivery is requested for a message, the MTP user will operate as in the prior art. However, when out-of-sequence message service is requested, traffic will be distributed more evenly between link sets, based on the use of a link selector value maintained in memory.

The method of the invention for selecting a link set comprises the steps of maintaining a link selector value in memory, determining that the message (which includes a destination point code and signaling link selection code) does not require in-sequence delivery, and then selecting the link set according to the destination point code, the signaling link selection code, and the link selector value. The link selector value is typically assigned an initial value and a maximum value (being incremented each time a link set is selected up to a maximum value). Determining whether the message requires in-sequence delivery usually includes receiving a request for delivery of the message and testing the value of a bit (such as a Service Information Octet having a sub-service field, including the bit to be tested).

The invention also includes a memory node with a load sharing memory having a list of load sharing link sets. The message is routed to a receiving node over a selected one of the load sharing link sets using the link selector value. The memory node includes a link selector memory to maintain the link selector value, which is incremented from a minimum initial value to a maximum value, and then reset. Each time a link set is selected, the link selector value is incremented by a value of one after the message is sent to the receiving node using the selected link set.

In another aspect of the invention, a telecommunications network includes a plurality of load sharing link sets for routing a message. The network also has a memory node with a load sharing memory including a list of the load sharing link sets, a signaling link memory for storing a signaling link selection code, and a link selector memory for maintaining a link selector value associated with the maximum value of the link selector value. The network also includes a receiving node, wherein the message is routed to the receiving node over the selected load sharing link set. As described previously, the link selector value is incremented by one after the message is sent, and then reset to the initial value whenever incrementing the link selector value provides a new value which is greater than the maximum allowed value.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EXEMPLARY EMBODIMENTS

Figure 3:
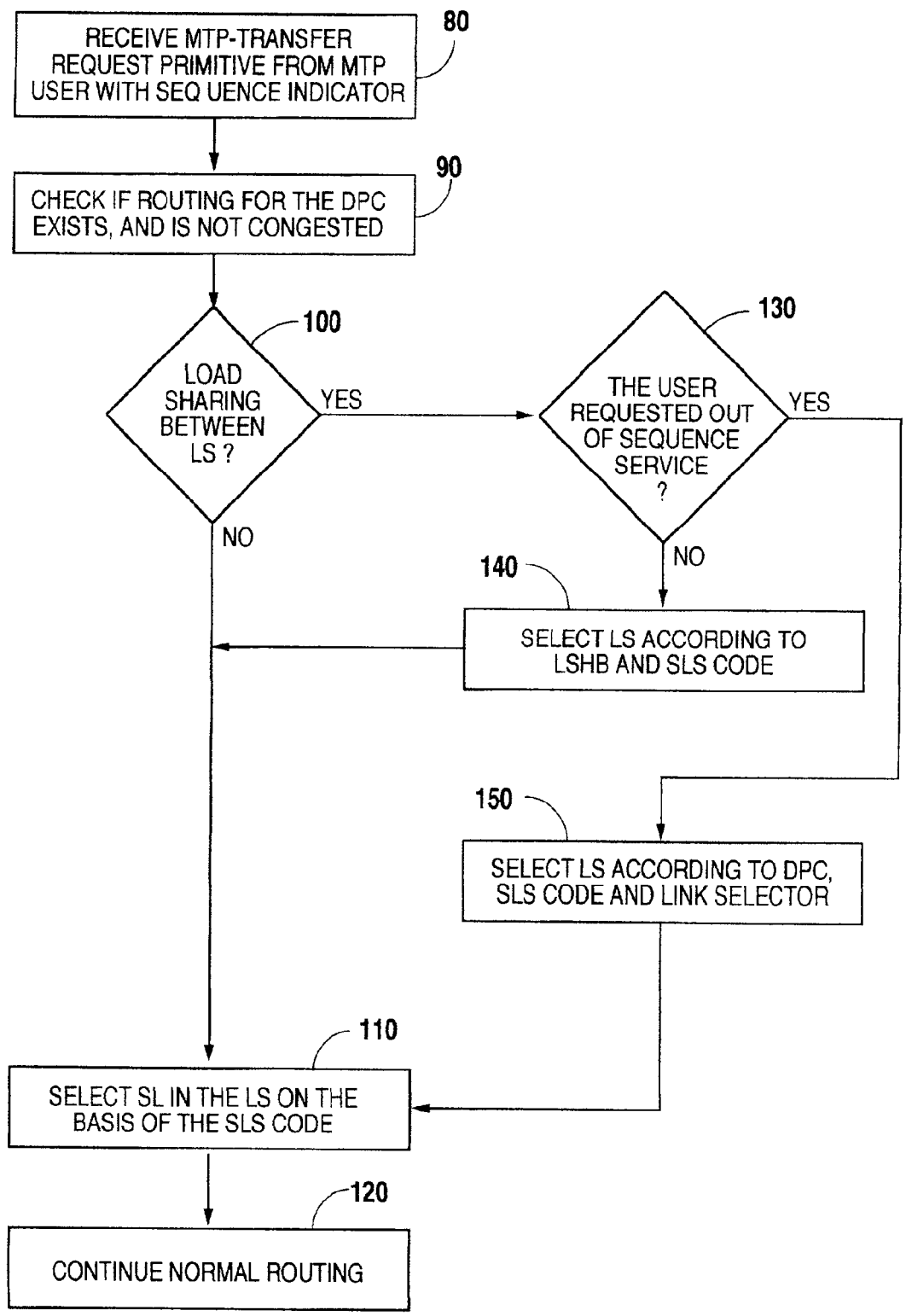
FIG. 3 is a flow chart diagram illustrating the method of the present invention.

Turning now to FIG. 3, a flow chart diagram illustrating the method of the present invention can be seen. The method begins in step 80, wherein a MTP-transfer request primitive from the MTP user is received. The request typically includes a sequence indicator as a bit or flag within the sub-service field of the Service Information Octet (SIO). This request is typically included with an originating message. In the case of a non-originating message, a new sequence indicator can be included. Thus, in non-originating SS7 messages, the sequence indicator requires a flag, or single bit field, which can be assigned using a spare bit in the sub-service field, as part of the Service Information Octet (SIO). Of course, if the MTP user always sends out-of-sequence messages, no sequence indicator or determination will be needed, as described below.

If a route for the message to the Destination Point Code (DPC) exists, and is not congested, as determined in step 90, then a determination is made as to whether load sharing between link sets is possible in step 100. If not, then the signaling link in the link set will be selected on the basis of the SLS code in step 110, and normal routing of the message will continue in step 120. However, if load sharing is possible, then the method continues with step 130, wherein a determination is made as to whether out-of-sequence service has been requested. As noted above, it may well be that some MTP users will always use out-of-sequence service messaging. In this case, no determination is required, and the links will automatically be selected according to step 150 using the DPC, the SLS code, and a link selector value. Step 150 will also be the next step if out-of-sequence service is specifically requested. If in-sequence service is requested, then the method continues from step 130 to step 140, wherein the link set is selected according to the LSHB and SLS code, and the signaling link is selected in step 110, as described above.

Figure 4:
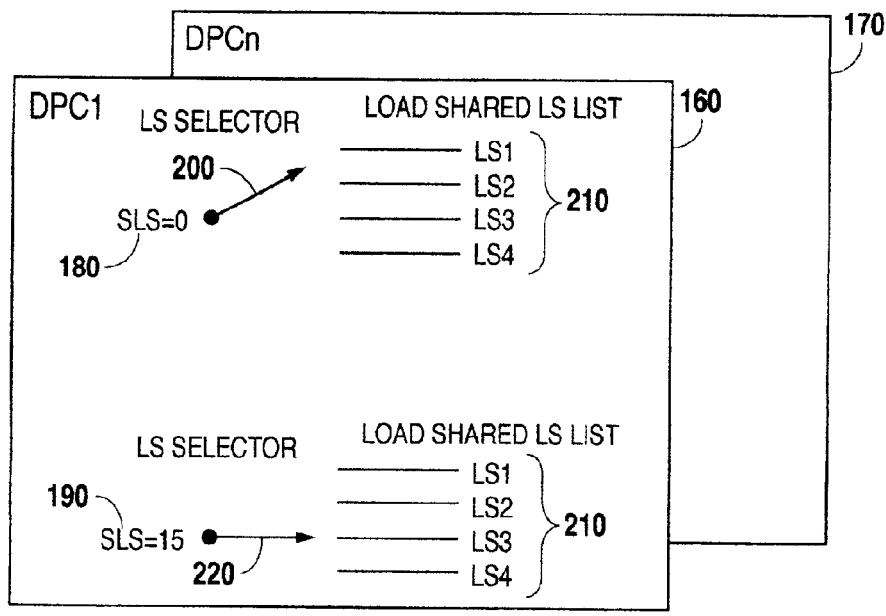
FIG. 4 is a diagram illustrating link set selection using the method of the present invention.

As can be seen in FIG. 4, a set of link set selectors 200, 220 is assigned to each DPC in the network. Thus, DPC1 160 (which may designate a sending node, a receiving node, and/or a memory node) has a link selector 200, 220 assigned to each SLS code 180, 190. For example, the link selector 200 is assigned to the SLS code=0 180, and the link selector 220 is assigned to the SLS code=15. Each link selector 200, 220 is used to incrementally select a link set for load sharing. For example, the link selector 200 is used to select between the link sets 210 for load sharing, and the link selector 220 is also used to select among the same link sets 210. As each message is sent, the link selector for the assigned SLS code is incremented by a value of 1 as it sequences through the link sets. Thus, for example, the link selector 200 is incremented every time a message having an SLS code=0 180 is to be routed through the link sets 210. The link selector 200 is initialized to point to the first link set when the first message arrives having an SLS code=0 180. After the first message is sent, the link selector 200 is incremented to indicate that the second link set is to be used for sending the next message having an SLS code=0 180. The link selector 200 continues to be incremented with each arriving message having an SLS code=0 180 until the maximum value (e.g., in this case, link set 4) is reached. Then, instead of incrementing to a higher value, the link selector 200 is reset to the minimum or initial value so as to point to link set 1.

Each link selector assigned to the various SLS codes is incremented in a similar fashion. Thus, the link selector 220 will also be incremented so as to point to link sets 1 through 4 for arriving messages which include SLS codes=15 190. In this manner, the messages including SLS codes from 0 to 15 180, 190 are equally distributed between the link sets, and between the signaling links included in the various link sets.

In summary, for each message, the MTP user will determine if the message requires in-sequence delivery or out-of-sequence delivery. For in-sequence delivery, load sharing will be treated according to ITU-T recommendation Q.704. For out-of-sequence delivery, a new mechanism will be used to select the link set to be used for routing. For every combination of destination and SLS code, there will be a link set selector or pointer to the link set that will be assigned to individual messages. Once a message is sent, the link set selector or pointer will be updated to point to the next load shared link set in the list of load shared link sets maintained for a particular destination. Once the last link set in the list is reached, then the link set selector or pointer will be updated to point to the first link set in the list. Thus, the link set selector removes the limitation of 16 paths imposed by the prior art, wherein the SLS code doesn't change. In the method and apparatus of the present invention, the link set selector or pointer acts as a "virtual" SLS code. This approach has the additional benefit that nodes which do not support out-of-sequence service will still f unction after the method and apparatus of the invention are installed in the network, such that the new approach is compatible with existing networks.

Thus, when a link set is included as part of a telecommunications network having a memory, the method of selecting the link set for routing a message having a destination point code and a signaling link selection code includes the steps of: maintaining a link selector value in the memory, determining that the message does not require in-sequence delivery, and selecting the link set according to the destination point code, the signaling link selection code, and the link selector value. The link selector value, as discussed above, maybe assigned an initial value (e.g., pointing to the first link set in a list of link sets) and a maximum value, such that the link selector value is not allowed to exceed the maximum value (e.g., pointing to the last link set in a list of link sets). Typically, the link selector value is initialized to an initial value (i.e., the first link set in a list of link sets), incremented by a value of one to provide an incremented link selector value (to point to the "next" link set), and, if incrementing the link selector value provides an incremented link selector value which is greater than the maximum value, resetting the link selector value to the initial value. The steps of incrementing the link selector value and resetting the link selector value to the initial value may be repeated in a continuous fashion. Of course, as described above, incrementing the link selector value typically occurs after the link set for sending the arriving message has been selected.

The determination that a message does not require in-sequence delivery may include the step of receiving a request for delivery of the message, which may further include the step of testing the value of a bit contained in the message, such as one of several bits contained within the sub-service field of a Service Information Octet. Of course, under certain circumstances, the determination of whether in-sequence message delivery is required can be made ahead of time (e.g., a default situation), since certain MTP users always make use of out-of-sequence message delivery. The method may also comprise the steps of including requests for out-of-sequence delivery within the message, and routing the message over the link set from a first node to a second node within the telecommunications network.

Figure 5:
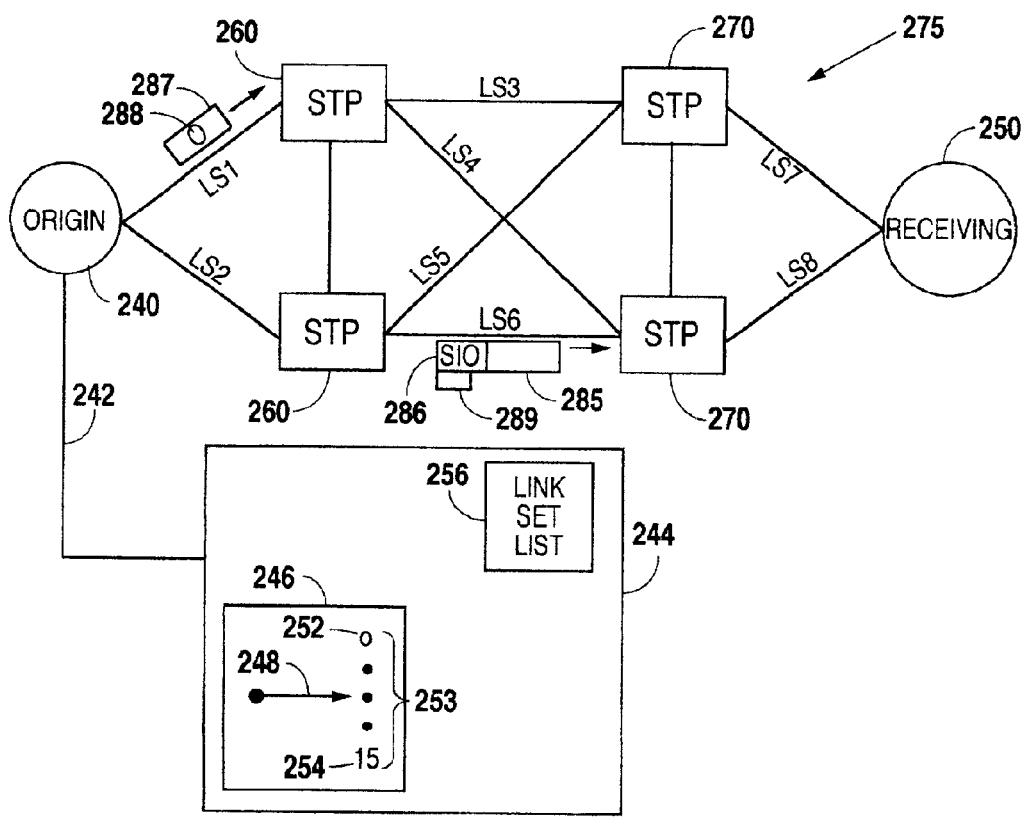
FIGS. 5 and 6 are a network block diagram and link set/signaling link block diagram, respectively, illustrating distribution of messages between signaling links and link sets using the method and apparatus of the present invention.

Turning now to FIG. 5, a telecommunications network 275 block diagram can be seen. In this case, the Signaling Transfer Points (STPs) 260, 270 are arranged between a message originating node 240 and a message receiving node 250. As can be seen, various link sets (i.e., LS1, LS2, . . . LS7, LS8) connect the origination node 240, the STPs 260, 270, and the receiving node 250. Also in electronic communication with the origination node 240 is a memory node 244, which includes a load sharing memory 256 having a list of load sharing link sets (e.g., in this case, LS1, LS2, . . . LS7, LS8). The link selector memory 246 is used to maintain the link selector value 248 associated with a minimum value 252 and a maximum value 254. As described above, the link selector value 248 is incremented to point to the next link set in the series (i.e., the link set following the selected link set) when the message is sent to the receiving node 250 over a selected one of the load sharing link sets. Of course, the link selector value 248 is reset to the initial value 252 whenever incrementing the link selector value 248 provides an incremented link selector value which is greater than the maximum value 254. Of course, the link selector value can also be decremented to the minimum value initialized to the maximum value, and then reset. It should be noted that the memory node 244 and/or the memories 246, 256 may be incorporated entirely within the origination or sending node 240. Similarly, the memories 246, 256 may be part of a single contiguous memory, or independent.

Using this approach with the network 275, traffic including all 16 of the SLS codes will be sent to each one of the link sets defined in the load sharing link set list for the destination receiving node 250. In most cases, this results in a greatly increased equitable distribution of message traffic between signaling links. For example, if there are 1, 2, 4, 8, or 16 signaling links present, there will be a perfectly even distribution of message traffic. If three signaling links are present, then the relative difference between links is a mere 20% with regard to equitable distribution of message traffic. For five signaling links, the difference is about 33%. For six or seven signaling links, the difference is about 50%, and for 9 to 15 signaling links, the difference may be as high as 100%. Even so, the number of cases with equitable distribution is much better than that provided by even the best case LSHB method (i.e., LSHB=3), wherein the deviation for three signaling links may be as much as 50%, and as much as 100% for five, six, or seven signaling links. This difference can be easily seen by comparing Table 3 (which uses the LSHB method) and the traffic distribution illustrated in Table 4, which applies to the method of the present invention.

TABLE 4

| # of SLs for LS1 | LSHB not used due to the NEW Link Set selector Independent of the number of Link Sets |
|---|---|
| 2 | SL1-0,2,4,6,8,10,12,14-50% SL2-1,3,5,7,9,11,13,15-50% |

TABLE 4-continued

| # of SLs for LS1 | LSHB not used due to the NEW Link Set selector Independent of the number of Link Sets |
|---|---|
| 3 | SL1-0,3,6,9,12,15-37.5% |
|   | SL2-1,4,7,10,13-31.25% |
|   | SL3-2,5,8,11,14-31.25% |
| 4 | SL1-0,4,8,12-25% |
|   | SL2-1,5,9,13-25% |
|   | SL3-2,6,10,14-25% |
|   | SL4-3,7,11,15-25% |
| 5 | SL1-0,5,10,15-25% |
|   | SL2-1,6,11-18.75% |
|   | SL3-2,7,12-18.75% |
|   | SL4-3,8,13-18.75% |
|   | SL5-4,9,14-18.75% |
| 6 | SL1-0,6,12-18.75% |
|   | SL2-1,7,13-18.75% |
|   | SL3-2,8,14-18.75% |
|   | SL4-3,9,15-18.75% |
|   | SL5-4,10-12.5% |
|   | SL6-5,11-12.5% |
| 7 | SL1-0,7,14-18.75% |
|   | SL2-1,8,15-18.75% |
|   | SL3-2,9-12.5% |
|   | SL4-3,10-12.5% |
|   | SL5-4,11-12.5% |
|   | SL6-5,12-12.5% |
|   | SL7-6,13-12.5% |
| 8 | SL1-0,8-12.5% |
|   | SL2-1,9-12.5% |
|   | SL3-2,10-12.5% |
|   | SL4-3,11-12.5% |
|   | SL5-4,12-12.5% |
|   | SL6-5,13-12.5% |
|   | SL7-6,14-12.5% |
|   | SL8-7,15-12.5% |

Figure 1:
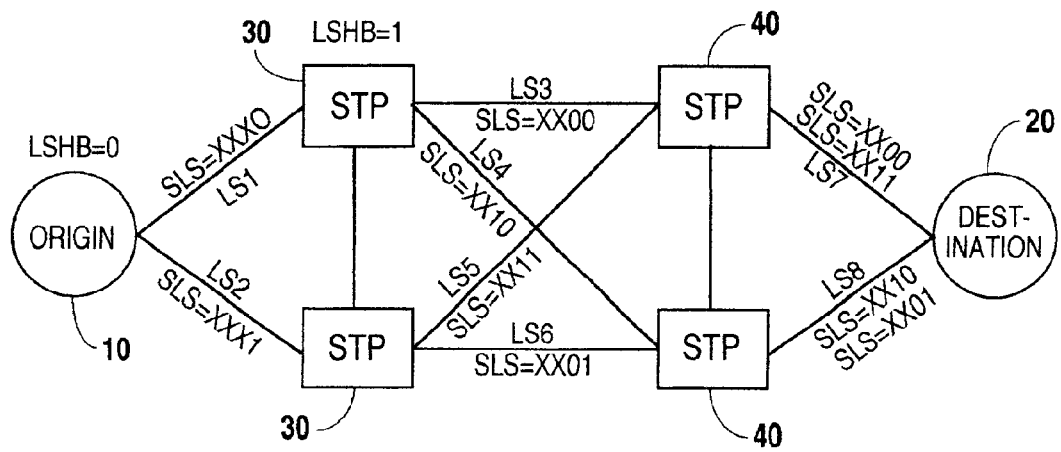
FIG. 1, previously described, is a prior art network block diagram.
Figure 2:
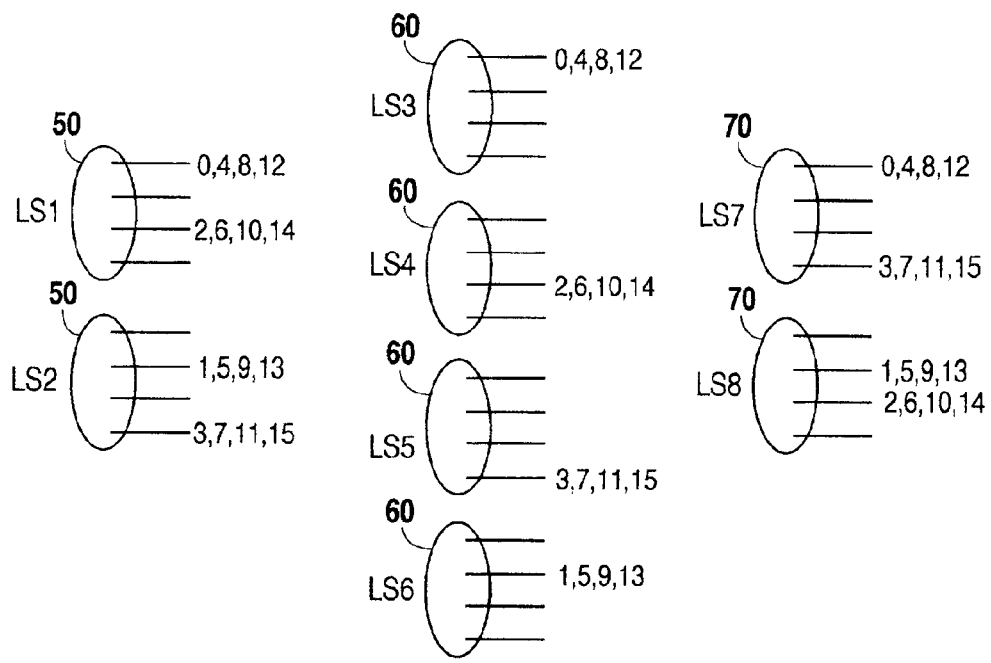
FIG. 2, previously described, is a prior art link set and signaling link message distribution block chart diagram.
Figure 6:
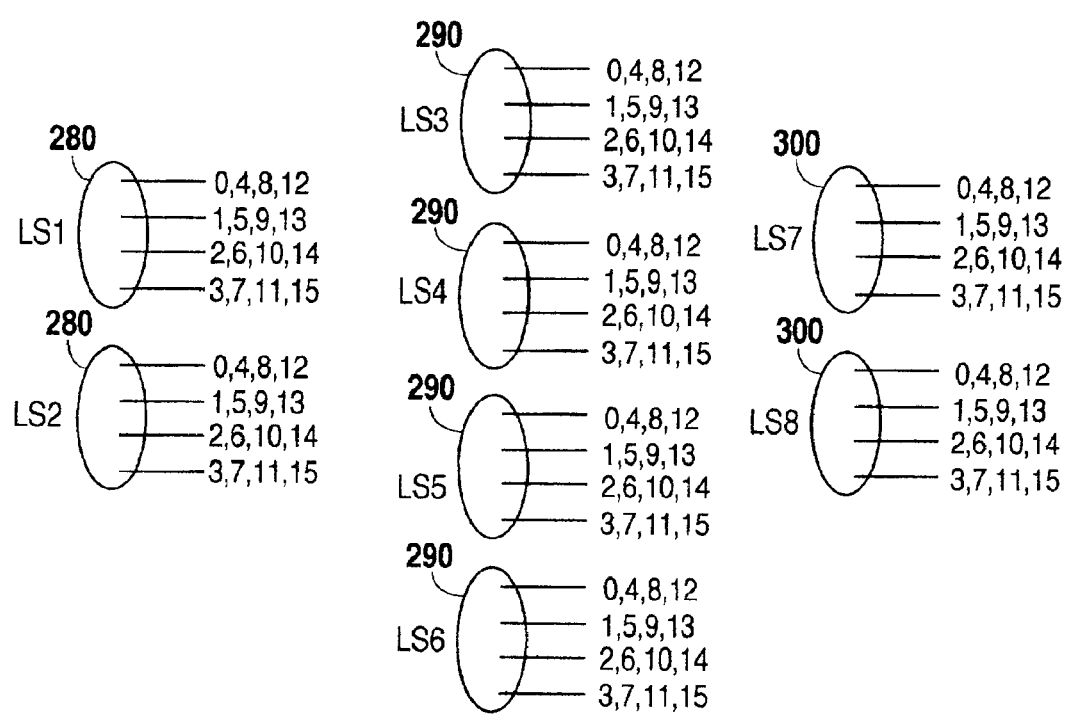

Turning to FIG. 6, the distribution of SLS codes for eight link sets 280, 290, 300 is shown to be evenly divided between link sets 280, 290, 300, as well as between signaling links within individual link sets 280, 290, 300 when the apparatus and method of the present invention are used to manage message traffic (compare to FIG. 2). As mentioned above, for originating messages, the MTP-TRANSFER request can be used to carry the sequence indicator when the method of the present invention is implemented on a per-message basis. For messages in-transit, a new sequence indicator can be implemented as a one bit field, or flag, as part of the spare bits included in the sub-service field of the Service Information Octet, for example. As subsequent nodes support MTP out-of-sequence service, the indicator requesting out-of-sequence service can be sent along in the spare bits of the sub-service field.

Thus, the invention also includes a telecommunications network 275 having a plurality of load sharing link sets LS1 . . . LS8 for routing a message 285 which comprises a memory node 244 (which can also be a sending or origination node) and a receiving node 250. The memory node 244 includes a load sharing memory 256 with a list of the load sharing link sets LS1 . . . LS8. The memory node 244 also includes a signaling link memory 246 for storing a signaling link selection code 253 and a link selector memory 246 for maintaining a link selector value 248 associated with a maximum value 254.

The receiving node 250 is in electronic communication with the sending node 240, as is the memory node 244. The receiving node 250 receives the message 285 routed over a selected one of the load sharing link sets (e.g., LS6) and the link selector value 248 is incremented by one so as to point to the next SLS code 253 in the list of link sets maintained in the load sharing memory 256. When incrementing the link selector value 248 to point to the next link set in the series, and when increment the value will exceed the maximum value 254, the link selector value 248 is reset to the initial value 252.

The receiving node 250 is adapted to receive a request for out-of-sequence delivery. The sending node 240 is typically adapted to send a request 287 for delivery of a message. The request typically includes a bit 288 having a first value and a second value, wherein the first value indicates that out-of-sequence delivery is requested (e.g., bit value=1), and the second value indicates that in-sequence delivery is requested (e.g., bit value=0). The message 285 may also include a Service Information Octet 286, having a sub-service field 289 including a bit 291 having first and second values, as described previously. Thus, if the sub-service field bit 289 of the SIO has a value of "1", then out-of-sequence delivery is requested. However, if the sub-service field bit or flag 289 has a value of "0", then in-sequence message delivery is requested. Of course, those skilled in the art will realize that the absolute bit values are not important. What is important is that a distinction can be made between out-of-sequence message delivery and in-sequence message delivery.

Although the invention has been described with reference to specific embodiments, this description is not meant to be construed in a limited sense. The various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention, or their equivalents.

What is claimed is:

1. A method of selecting a link set of a telecommunications network for routing a message having a destination point code and a signaling link selection code, comprising the steps of: maintaining a link selector value in a memory, wherein the link selector value is assigned an initial value and a maximum value, and wherein the step of maintaining a link selector value in the memory further includes the steps of: a) initializing the link selector value to the initial value; b) incrementing the link selector value to provide an incremented link selector value; and c) otherwise, if incrementing the link selector provides an incremented link selector value which is greater than the maximum value, resetting the link selector value to the initial value; and determining that the message does not require in-sequence delivery; and selecting the link set according to the combination of the destination point code, the signaling link selection code, and the link selector code.

2. The method of claim 1, wherein steps b and c are repeated.

3. The method of claim 1, wherein the step of incrementing the link selector value occurs after the step of selecting the link set is accomplished.

4. The method of claim 1, wherein the step of determining that the message does not require in-sequence delivery further includes the step of:

receiving a request for delivery of the message.

5. The method claim 4, wherein the request includes a bit indicating whether in-sequence message delivery is required, and wherein the step of receiving a request for delivery of the message includes the step of:

testing the value of the bit to determine whether in-sequence delivery is required.

6. The method of claim 4, wherein the message includes a Service Information Octet having a sub-service field including a bit indicating whether in-sequence message delivery is required, and wherein the step of receiving a request for delivery of the message includes the step of:

testing the value of the bit to determine whether in-sequence delivery is required.

7. The method of claim 1, wherein the telecommunications network includes a first node and a second node, further including the steps of:

including a request for out-of-sequence delivery within the message; and routing the message over the link set from the first node to the second node.

8. A memory node including a load sharing memory having a list of load sharing link sets included within a telecommunications network having a receiving node, wherein a message is routed to the receiving node over a selected one of the load sharing link sets, comprising:

a link selector memory for maintaining a link selector value which is associated with an initial value and a maximum value, wherein the link selector value is initialized to the initial value, wherein the link selector value is incremented before the message is sent to the receiving node over the selected one of the load sharing link sets, and wherein the link selector value is reset to the initial value whenever incrementing the link selector value provides an incremented link selector value which is greater than the maximum value.

9. A telecommunications network including a plurality of load sharing link sets for routing a message, comprising:

a sending node;

a memory node in electronic communication with the sending node, including a load sharing memory having a list of the load sharing link sets, a signaling link memory for storing a signaling link selection code, and a link selector memory for maintaining a link selector value associated with a maximum value; and a receiving node in electronic communication with the sending node, wherein the message is routed to the receiving node over a selected one of the load sharing link sets causing the link selector value to be incremented, and wherein the link selector value is reset to an initial value whenever incrementing the link selector value provides an incremented link selector value which is greater than the maximum value.

10. The telecommunications network of claim 9, wherein the receiving node is adapted to receive a request for out-of-sequence delivery.

11. The telecommunications network of claim 9 wherein the sending node is adapted to send a request for delivery of the message.

12. The telecommunications network of claim 11, wherein the request includes a bit having a first value and a second value, wherein the first value indicates that out-of-sequence delivery is requested, and wherein the second value indicates that in-sequence delivery is requested.

13. The telecommunications network of claim 9, wherein the message includes a Service Information Octet having a sub-service field including a bit having a first value and a second value, wherein the first value indicates that out-of-sequence delivery is requested, and wherein the second value indicates that in-sequence delivery is requested.

* * * * *

UNITED STATES PATENT AND TRADEMARK OFFICE
CERTIFICATE OF CORRECTION

PATENT NO. : 6,965,567 B2 Page 1 of 1
APPLICATION NO. : 09/829054
DATED : November 15, 2005
INVENTOR(S) : Ituriel Mar Ramos et al.

It is certified that error appears in the above-identified patent and that said Letters Patent is hereby corrected as shown below:

On the Title Page, item (57), under "ABSTRACT", in Column 2, Line 8, insert -- memory having -- before "a list of".

On the Title Page, item (57), under "ABSTRACT", in Column 2, Line 8, delete "links set" and insert -- link sets --, therefor.

In the Drawings, Sheet 2 of 4, in Fig. 3, in "Tag 80", Line 3, delete "SEQ UENCE" and insert -- SEQUENCE --, therefor.

In Column 2, Line 37, delete "part" and insert -- Part --, therefor.

In Column 6, Line 54, delete "15" and insert -- 15 190 --, therefor.

Signed and Sealed this

Sixth Day of May, 2008

JON W. DUDAS
*Director of the United States Patent and Trademark Office*